United States Patent [19]
Cherukuri et al.

[11] Patent Number: 5,980,704
[45] Date of Patent: Nov. 9, 1999

[54] METHOD AND SYSTEM FOR INHIBITING CROSS-CONTAMINATION IN FLUIDS OF COMBINATORIAL CHEMISTRY DEVICE

[75] Inventors: Satyam Choudary Cherukuri; Robert Richard Demers, both of Cranbury; Zhong Hui Hugh Fan, Plainsboro; Aaron W. Levine, Lawrenceville; Sterling Edward McBride, Lawrence Township, Mercer County; Peter John Zanzucchi, West Windsor Township, Mercer County, all of N.J.

[73] Assignee: David Sarnoff Research Center Inc., Princeton, N.J.

[21] Appl. No.: 08/726,953

[22] Filed: Oct. 7, 1996

Related U.S. Application Data

[62] Division of application No. 08/483,331, Jun. 7, 1995, Pat. No. 5,603,351.

[51] Int. Cl.⁶ .............................. G25B 9/00; G25B 15/08
[52] U.S. Cl. ............................................. 204/269; 422/81
[58] Field of Search ................................ 204/269; 422/81

[56] References Cited

U.S. PATENT DOCUMENTS

| | | |
|---|---|---|
| 3,494,723 | 2/1970 | Gray . |
| 3,615,241 | 10/1971 | Low et al. ................................. 23/259 |

(List continued on next page.)

FOREIGN PATENT DOCUMENTS

| | | |
|---|---|---|
| 0 198 413 | 10/1986 | European Pat. Off. . |
| 0 402 995 | 12/1990 | European Pat. Off. . |
| 0 430 248 | 6/1991 | European Pat. Off. . |
| 0 501 796 A2 | 2/1992 | European Pat. Off. . |
| 0 483 117 | 4/1992 | European Pat. Off. . |
| 3811052 C2 | 8/1989 | Germany . |
| 2248840 | 4/1992 | United Kingdom . |
| WO 90/09596 | 8/1990 | WIPO . |
| WO 91/16966 | 11/1991 | WIPO . |
| WO 92/10092 | 6/1992 | WIPO . |
| WO 93/06121 | 4/1993 | WIPO . |
| WO 93/22058 | 11/1993 | WIPO . |
| WO 94/05414 | 3/1994 | WIPO . |
| WO 94/10128 | 5/1994 | WIPO . |
| WO 95/12608 | 5/1995 | WIPO . |
| WO 96/04547 | 2/1996 | WIPO . |

OTHER PUBLICATIONS

Search Report for WO 93/22421, Nov. 11, 1993.
Search Report for WO 93/22055, Nov. 11, 1993.
Search Report for WO 93/22054, Nov. 11, 1993.
Search Report for WO 93/22053, Nov. 11, 1993.

(List continued on next page.)

*Primary Examiner*—Donald R. Valentine
*Attorney, Agent, or Firm*—William J. Burke

[57] ABSTRACT

A system and method for accomplishing a plurality of combinatorial processes in parallel comprising a microelectronic and fluidic array (device array) having micron-sized reservoirs, connecting microchannels and reaction cells etched into a substrate. The device array is supported by a station which serves to interface and perform electro-optic measurements of material in the reaction cells of the device array. The device array incorporates a modular configuration with three distinct layers or plates. The device array comprises a top feedthru plate, a center distribution plate and a bottom cell plate. The three plates are stacked vertically and coupled together to form a liquid-tight seal. Reservoirs, microchannels and reactions cells are controllably etched onto the plates using traditional semiconductor fabrication techniques. The top feedthru plate serves as a cover for the device array and contains apertures selectively positioned above the reservoirs located in the center distribution plate. The center distribution plate comprises a plurality of micron sized reservoirs, microchannels, reservoir feeds, cell feeds and overflow feeds for the distribution of reagent fluids to the reaction cells located in the bottom cell plate. The detachable bottom cell plate serves as a microlaboratory tray of reaction cells. Once the proper reagents or other materials are introduced into the reaction cells, the bottom cell plate is decoupled from the device array and removed for incubation or analysis.

13 Claims, 7 Drawing Sheets

U.S. PATENT DOCUMENTS

| | | | |
|---|---|---|---|
| 3,650,296 | 3/1972 | Johnson et al. | 137/624.18 |
| 3,901,731 | 8/1975 | Warszawski et al. | 136/86 R |
| 3,957,583 | 5/1976 | Gibson et al. | 195/103.5 R |
| 4,038,151 | 7/1977 | Fadler et al. | 195/127 |
| 4,271,119 | 6/1981 | Columbus | 422/50 |
| 4,276,048 | 6/1981 | Leaback | 23/230 R |
| 4,283,262 | 8/1981 | Cormier et al. | 204/195 M |
| 4,304,257 | 12/1981 | Webster | 137/559 |
| 4,310,399 | 1/1982 | Columbus | 204/195 R |
| 4,385,115 | 5/1983 | de Zabala et al. | 435/33 |
| 4,426,451 | 1/1984 | Columbus | 436/518 |
| 4,495,025 | 1/1985 | Haskell | 156/648 |
| 4,533,430 | 8/1985 | Bower | 156/643 |
| 4,589,952 | 5/1986 | Behringer et al. | 156/628 |
| 4,601,881 | 7/1986 | Webster | 422/67 |
| 4,607,526 | 8/1986 | Bachenheimer et al. | 73/432 PS |
| 4,676,274 | 6/1987 | Brown | 137/806 |
| 4,683,914 | 8/1987 | Brisland | 137/625.48 |
| 4,753,775 | 6/1988 | Ebersole et al. | 422/81 |
| 4,756,884 | 7/1988 | Hillman et al. | 422/73 |
| 4,891,120 | 1/1990 | Sethi et al. | 204/299 R |
| 4,908,112 | 3/1990 | Pace | 204/299 |
| 4,948,961 | 8/1990 | Hillman et al. | 250/252.1 |
| 4,960,486 | 10/1990 | Perkins et al. | 156/633 |
| 4,963,498 | 10/1990 | Hillman et al. | 436/69 |
| 4,999,283 | 3/1991 | Zavos et al. | 435/2 |
| 4,999,284 | 3/1991 | Ward et al. | 435/4 |
| 4,999,286 | 3/1991 | Gawel et al. | 435/7.32 |
| 5,000,817 | 3/1991 | Aine | 156/633 |
| 5,001,048 | 3/1991 | Taylor et al. | 435/4 |
| 5,003,822 | 4/1991 | Joshi | 73/204.23 |
| 5,006,749 | 4/1991 | White | 310/323 |
| 5,063,081 | 11/1991 | Cozzette et al. | 427/2 |
| 5,066,938 | 11/1991 | Kobashi et al. | 338/22 |
| 5,073,029 | 12/1991 | Eberly et al. | 356/432 |
| 5,077,017 | 12/1991 | Gorin et al. | 422/100 |
| 5,081,045 | 1/1992 | McGill | 422/81 X |
| 5,104,813 | 4/1992 | Besemer et al. | 436/179 |
| 5,112,455 | 5/1992 | Cozzette et al. | 294/153.12 |
| 5,118,384 | 6/1992 | Harmon et al. | 156/643 |
| 5,129,261 | 7/1992 | Riley | 73/313 |
| 5,129,262 | 7/1992 | White et al. | 73/599 |
| 5,140,161 | 8/1992 | Hillman et al. | 250/341 |
| 5,141,868 | 8/1992 | Shanks et al. | 435/288 |
| 5,143,854 | 9/1992 | Pirrung et al. | 436/518 |
| 5,144,139 | 9/1992 | Hillman et al. | 250/341 |
| 5,147,607 | 9/1992 | Mochida | 422/57 |
| 5,156,810 | 10/1992 | Ribi | 422/82.01 |
| 5,164,598 | 11/1992 | Hillman et al. | 250/341 |
| 5,176,203 | 1/1993 | Larzul | 165/61 |
| 5,186,001 | 2/1993 | Muntz et al. | 60/515 |
| 5,188,963 | 2/1993 | Stapleton | 435/299 |
| 5,189,914 | 3/1993 | White et al. | 73/599 |
| 5,194,133 | 3/1993 | Clark et al. | 204/299 |
| 5,200,051 | 4/1993 | Cozzette et al. | 204/403 |
| 5,204,525 | 4/1993 | Hillman et al. | 250/252.1 |
| 5,212,988 | 5/1993 | White et al. | 73/599 |
| 5,220,189 | 6/1993 | Higashi et al. | 257/467 |
| 5,229,297 | 7/1993 | Schnipelsky et al. | 436/94 |
| 5,230,864 | 7/1993 | Columbus | 422/100 |
| 5,230,866 | 7/1993 | Shartle et al. | 422/103 |
| 5,238,853 | 8/1993 | Calzi et al. | 436/68 |
| 5,241,363 | 8/1993 | Garner | 356/326 |
| 5,252,743 | 10/1993 | Barrett et al. | 548/303.7 |
| 5,262,127 | 11/1993 | Wise et al. | 422/98 |
| 5,270,170 | 12/1993 | Schatz et al. | 435/7.37 |
| 5,277,754 | 1/1994 | Hadimioglu et al. | 156/644 |
| 5,279,791 | 1/1994 | Aldrich et al. | 422/58 |
| 5,288,463 | 2/1994 | Chemelli | 422/58 |
| 5,296,114 | 3/1994 | Manz | 204/180 |
| 5,296,375 | 3/1994 | Kricka et al. | 435/291 |
| 5,304,487 | 4/1994 | Wilding et al. | 435/291 |
| 5,312,590 | 5/1994 | Gunasingham | 422/56 |
| 5,320,139 | 6/1994 | Paul et al. | 137/567 |
| 5,324,483 | 6/1994 | Cody et al. | 422/131 |
| 5,324,633 | 6/1994 | Foder et al. | 435/6 |
| 5,359,115 | 10/1994 | Campbell et al. | 558/110 |
| 5,384,261 | 1/1995 | Winkler et al. | 436/518 |
| 5,412,087 | 5/1995 | McGall et al. | 536/24.3 |
| 5,420,328 | 5/1995 | Campbell | 538/110 |
| 5,424,186 | 6/1995 | Fodor et al. | 435/6 |
| 5,427,946 | 6/1995 | Kricka et al. | 435/291 |
| 5,447,691 | 9/1995 | Sanuki | 422/100 |
| 5,463,564 | 10/1995 | Agrafiotis et al. | 364/496 |
| 5,480,614 | 1/1996 | Kamahori | 422/70 |
| 5,503,985 | 4/1996 | Cathey et al. | 435/7.9 |
| 5,571,410 | 11/1996 | Swedberg et al. | 204/451 X |
| 5,580,523 | 12/1996 | Bard | 422/50 |

OTHER PUBLICATIONS

Gazette entry for Tsui et al., Variable Range Position Indicator, U.S. Patent No. 5,345,215, Jun. 17, 1993.

Gazette entry for Murphy et al., Automated Capillary Scanning System, U.S. Patent No. 5,009,003, Feb. 14, 1990.

Woolley et al., Ultra–High–Speed DNA Fragment Separations Using Microfabricated Capillary Array Electrophoresis Chips, Proc. Natl. Acad. Sci. USA 91:11348–11352, Nov. 1994.

Dasgupta et al., Electroosmosis: A Reliable Fluid Propulsion System for Flow Injection Analysis, Anal. Chem. 66:1792–1798, 1994, (No Month).

Harmon et al., Selectivity in Electrophoretically Mediated Microanalysis by Control of Product Detection Time, Anal. Chem. 66:3979–3805, 1994, (No Month).

Patterson, et al., Electrophoretically Mediated Microanalysis of Calcium, Journal of Chromatography A, 662:389–395, 1994, (No Month).

Microfabricated Device is Chemistry Lab on a Chip, Chemical & Engineering News, (No Date).

Harmon et al., Mathematical Treatment of Electrophoretically Mediated Microanalysis, Anal. Chem. 65:2655–2662, 1993, (No Month).

Avila and Whitesides, Catalytic Activity of Native Enzymes During Capillary Electrophoresis: An Enzymatic Microreactor, J. Org. Chem. 58:5508–5512 1993 (No Month).

Harmon, et al., Electrophoretically Mediated Microanalysis of Ethanol, J. Chromatog. A, 657:429–434, 1993, (No Month).

Bao and Regnier, Ultramicro Enzyme Assays in a Capillary Electrophoretic System, J. Chrom. 608:217–224, 1992, No Month.

Richeter et al., A Micromachined Electrohydrodynamic (EHD) Pump, Sensors and Actuators A, 29:159–168, 1992 (No Month).

Bart et al., Microfabricated Electrohydrodynamic Pumps, Sensors and Actuators, A21–A23:193–197, 1990, (No Month).

Melcher, Traveling–Wave Induced Electroconvection, The Physics of Fluids, 9:1548–1555, 1996, (No Month).

Pickard, Ion Drag Pumping. I. Theory, J. Applied Physics 34:246–250, 1963, (No Month).

Pickard, Ion Drag Pumping. II. Experiment, J. Applied Physics, 34:251–258, 1963, (No Month).

Stuetzer, Ion Drag Pumps, J. Applied Physics, 31:136–146, 1960, (No Month).

Tracey, et al., Microfabricated Microhaemorheometer, pp. 82–84, 1991, (No Month).

Medynski, Synthetic Peptide Combinatorial Libraries, Bio/Technology, vol. 12, Jul. 1994.

Jacobson et al., Precolumn Reactions with Electrophoretic Analysis Integrated on a Microchip, Anal, Chem., 66:4127–4123, 1994, (No Month).

Jacobson, et al., Effects of Injection Schemes and Column Geometry on the Performance of Microchip Electrophoresis Devices, Anal. Chem. 1994, 66:1107–1113, (No Month).

Jacobson, et al., High–Speed Separations on a Microchip, anal. Chem. 1994, 66:1114–1118, (No Month).

Fan, et al., Micromachining of Capillary Electrophoresis Injectors and Separators on Glass Chips and Evaluation of Flow at Capillary Intersections, Anal. Chem., 1994, 6:177–184, (No Month).

Megregany, Microelectromechanical Systems, Circuits and Devices, Jul. 1993.

Harrison, et al., Micromachining a Miniaturized Capillary Electrophoresis–Based Chemical Analysis System on a Chip, Science, vol. 261, Aug. 13, 1993.

Harrison, et al., Capillary Electrophoresis and Sample Injection Systems Integrated on a Planar Glass Chip, Anal. Chem. 1992, 64:1926–1932, (No Month).

Fisher, Microchips for Drug Compounds, New York times, Mar. 3, 1991.

Fodor, ete al., Light–Directed, Spatially Addressable Parallel Chemical Synthesis, Research Article, Science, vol. 251, Feb. 15, 1991, pp. 767–773.

The Silver Shotguns, The Economist, Dec. 14–20, 1991, (No Month).

Howe, et al., Silicon Micromechanics; Sensors and Actuators on a Chip, IEEE Spectrum, Jul. 1990.

Wenzel, et al., A Multisensor Employing an Ultrasonic Lamb–Wave Oscillator, IEEE Transactions on Electron Devices, vol. 35, No. 5, Jun. 1988.

Angell, et al., Silicon Micromechanical Devices, Scientific American 248:44–55, 1983, (No Month).

Petersen, Silicon as a Mechanical Material, Proceedings of the IEEE, vol. 79, No. 5, May 1982.

Dialog Search, May 18, 1994.

Bao J. and Regnier E., Ultramicro Enzyme Assays in a Capillary Electrophoretic System, Journal of Chromatography, 608 (1992) pp. 217–224, (No Month).

Patterson D., Harmon B. and Regnier F., Electrophoretically Medicated Microanalysis of Calcium, Journal of Chromatography, 662 (1994) pp. 389–395, (No Month).

Patterson D., Harmon B. and Regnier F., Mathematical Treatment of Electrophoretically Medicated Microanalysis, Anal. Chem. (1993), 65, pp. 2655–2662, (No Month).

Harmon, B., Leesong, I. and Regnier, F., Selectivity in Electrophoretically Medicated Microanalysis by Control of Product Detection Time, Anal. Chem. (1994), 66, pp. 3797–3805, (No Month).

Patterson, D., Harmon B. and Regnier F., Electrophoretically Medicated Microanalysis of Ethanol, Journal of Chromatography, 657 (1993) pp. 429–434, (No Month).

Avila L. and Whitesides G., Catalytic Activity of Native Enzymes During Capillary Electrophoresis: An Enzymatic "Microreactor", J. Org. Chem., (1993), 58, 5508–5512, (No Month).

International Search Report from corresponding International Application No. PCT/US96/08686.

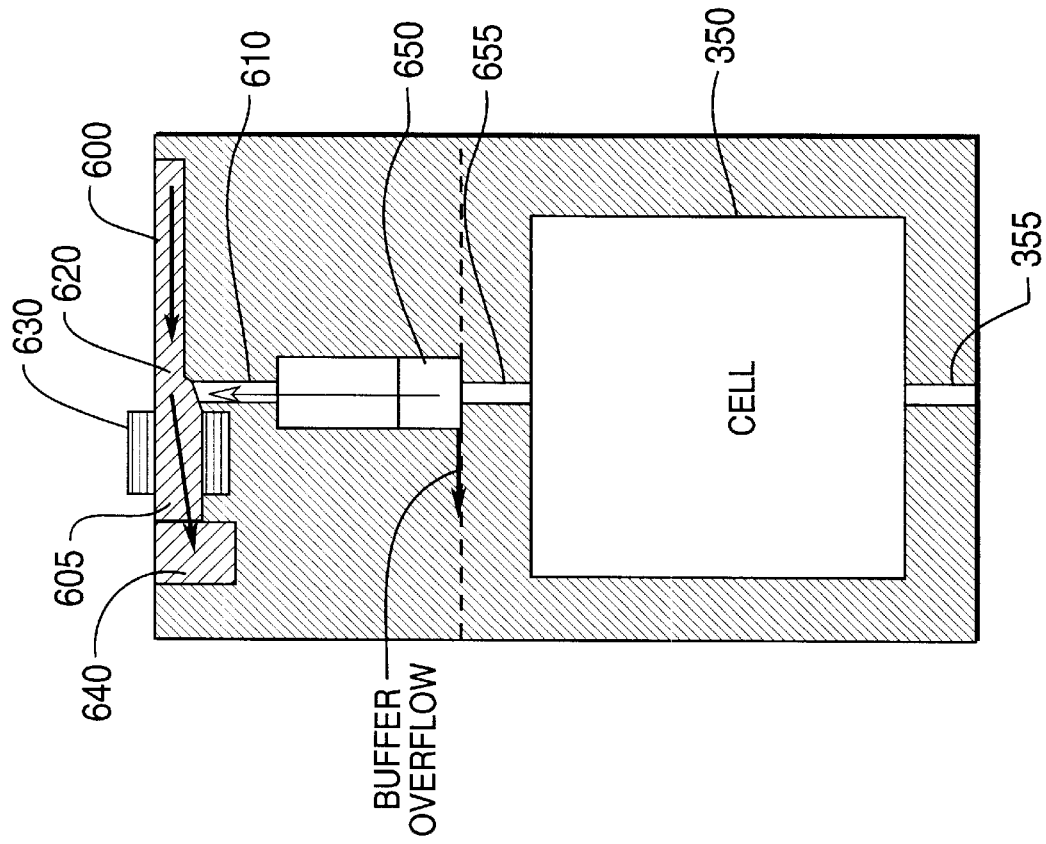
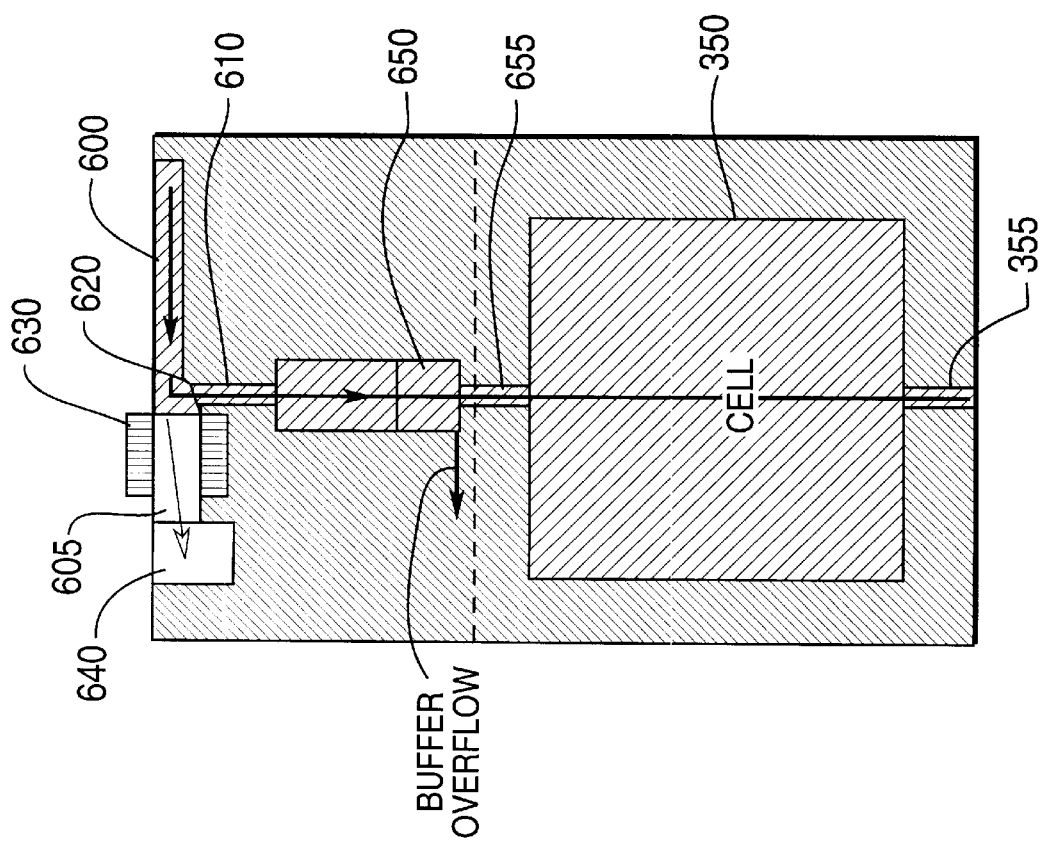

METHOD AND SYSTEM FOR INHIBITING CROSS-CONTAMINATION IN FLUIDS OF COMBINATORIAL CHEMISTRY DEVICE

This is a divisional application of application Ser. No. 08/483,331, filed Jun. 7, 1995, now U.S. Pat. No. 5,603,351, issued Feb. 18, 1997.

The present invention relates to a method and system for accomplishing various combinatorial processes, including syntheses, screening and chemical diagnostic assays. More particularly, this invention relates to a system and method that incorporates a layered array for inhibiting cross-contamination of reagent fluids used in such combinatorial processes.

BACKGROUND OF THE INVENTION

Traditional methods in the field of combinatorial chemistry for making a homologous series of compounds or testing of new potential drug compounds were often slow and tedious. The underlying reason is that each member of the series or each potential drug compound must be created individually and tested individually. During this testing stage, it is common that the exact composition and/or behavior of a compound or new potential drug is unknown. In order to discover the proper composition of a compound or to observe the behavior of a new potential drug, a multitude of experiments must be conducted. For example, a plurality of potential drug compounds is tested by using an agent to test a plurality of materials that may differ only by a single amino acid or nucleotide base, or have a different sequence of amino acids or nucleotides. Furthermore, these experiments may investigate the effectiveness of the compound in different concentrations or its reaction to other reagents. This process for discovering and developing compounds or a new potential drug by combinatorial chemistry is labor intensive and costly.

Traditionally, these experiments are conducted by manually injecting reagent fluids or other agents into a multitude of vials. Each vial is filled manually by a laboratory technician. The solution within each vial may differ only slightly from an adjoining vial so that permutations of the solution are investigated simultaneously. Generally, a receptor having a fluorescent tag is introduced to each vial and the solution is incubated with the receptor. When a proper reaction is obtained where the receptor reacts with the solution, the result can be detected optically by observing the site of the fluorescent tag. The fluorescent data is transmitted to a computer which identifies the compound reacted and the degree of the reaction. Thus, combinatorial chemistry allows screening of thousands of compounds for the desired activity.

Recently, the process has been improved to some degree with the introduction of robotics into the field. Robotic arms are employed to automate the process of depositing materials into the multitude of vials. This improvement relieves the laboratory technician from a tedious task and increases the efficiency and accuracy of the process. A robotic arm is able to more accurately deposit a precise amount of material repeatedly into different vials.

However, the process continues to face problems in the area of cost and space. With thousands of compounds being tested and in some cases incubated over a period of time, the process requires a large quantity of space to house the multitude of trays of vials. In addition, these vials are generally large and cumbersome to handle.

Furthermore, the process generally consumes a large quantity of reagents for testing thousands of compounds. These reagents and other materials used in the process are often very expensive or difficult to obtain. Thus, to reduce the cost and increase the efficiency of the process, it is necessary to replace the vials with other smaller reaction cells. By reducing the size of the reaction cell, the process consumes a smaller quantity of reagents. In addition, a proper control and delivery system is necessary for regulating and distributing minute amount of reagents to the reaction cells.

Recently, there are developments where traditional semiconductor techniques are combined with the synthesis of various compounds having potential biological activity. For example, a semiconductor or dielectric substrate is coated with a biologic precursor having such amino groups with a light-sensitive protective chemical. A series of masks are placed over the substrate with each mask having an opening. By introducing photosensitive amino acid through the openings, the reaction creates a particular compound that can be detected optically.

However, the synthesis of each reaction is not always complete and the process may need additional layers of mask for introducing new agents. Creating new masks is a complex and expensive process. In addition, the process of aligning a plurality of masks and forming openings in the mask in sequence requires careful alignment and is time consuming.

Nevertheless, the advantages in terms of size and efficiency of traditional semiconductor techniques are extremely attractive. Specifically, through the use of microchannels, the process of combinatorial chemistry is effectively conducted on a microcell scale. This approach addresses the problems of size and cost attributed to the traditional combinatorial process.

Therefore, a need exists in the art for a system and method that incorporates a microelectronic and fluidic array for accomplishing the process of combinatorial chemistry.

SUMMARY OF THE INVENTION

The system of the present invention comprises a microelectronic and fluidic array (device array) having micron sized reservoirs, connecting microchannels and reaction cells etched into a substrate. The device array is supported by a station which serves to interface and perform electro-optic measurements of material in the reaction cells of the device array. The station also controls the fluid flow of reagents to the reaction cells.

The device array incorporates a modular configuration with three distinct layers or plates. The device array comprises a top feedthru plate, a center distribution plate and a bottom cell plate. The three plates are stacked vertically and coupled together to form a liquid-tight seal. The top feedthru plate is bonded or fused to the center distribution plate, while the center distribution plate is detachably coupled to the bottom cell plate. The plates can be made from glass, fused silica, quartz or a silicon wafer. Reservoirs, microchannels and reaction cells are controllably etched onto the plates using traditional semiconductor fabrication techniques with a suitable chemical or laser etchant.

The top feedthru plate serves as a cover for the device array and contains apertures selectively positioned above the reservoirs located in the center distribution plate. These apertures provide the necessary openings for a loading module to fill the reservoirs with a plurality of reagents or other materials. The top feedthru plate further comprises a plurality of micropump electrodes that extend completely through the top feedthru plate. The micropump electrodes are coupled to a plurality of electrical contacts on one end and are geometrically shaped to act as electrofluidic pumps on the other end. These miniature pumps (micropumps) are activated by selectively applying a voltage source to the electrical contacts located on the top surface of the top feedthru plate.

The center distribution plate comprises a plurality of micron-sized reservoirs, microchannels, reservoir feeds, cell feeds and overflow feeds, which are selectively etched on both sides (top and bottom) of the center distribution plate. These channels and reservoirs form a grid delivery system where reservoirs are grouped into column reservoirs, row reservoirs and matrix reservoirs. Column reservoirs are coupled to microchannels that deliver reagents to a location vertical from the column reservoirs, while row reservoirs are coupled to microchannels that deliver reagents to a location horizontal from the row reservoirs. Finally, matrix reservoirs are coupled to microchannels that deliver reagents to a location both vertical and horizontal from the matrix reservoirs.

Thus, the center distribution plate is defined into a plurality of sectors in a grid configuration. Each sector on the center distribution plate is directly positioned above a reaction cell located on the bottom cell plate. The reagents channeled to a sector from the different reservoirs are prohibited from entering the cell feed by a plurality of dams. By activating the miniature pumps, selected reagents are drawn over the dams from the microchannels and deposited into the reaction cells located in the bottom cell plate via the cell feeds.

The detachable bottom cell plate comprises a plurality of micron-sized reaction cells and drain feeds. The bottom cell plate effectively serves as a microlaboratory tray of reaction cells replacing the tray of vials used in the traditional process of combinatorial chemistry. Once the proper reagents or other materials are introduced into the reaction cells, the bottom cell plate is decoupled from the device array and removed for incubation or analysis. Generally, the bottom cell plate is analyzed under a detector, such as a fluorescence detector, to screen for a desired reaction.

Finally, the device array is supported by a laboratory station. The station comprises a computer, a detector module, an interface module and a loading module. The computer is programmed to give instructions to the device array and to record test results obtained therefrom. The interface module controlled by the computer is coupled to the top feedthru plate to selectively activate miniature pumps within the device array. The detector module serves to determine whether a desired reaction has occurred, while the loading module supplies the necessary reagents and other materials to conduct the experiments within the device array.

In one embodiment of the present invention, the center distribution plate incorporates a continuous flow configuration as opposed to an interrupted flow configuration as disclosed above. The continuous flow configuration incorporates a steady flow of reagents within the microchannels. The flow of the reagents in the microchannels is directed toward a drain away from the reaction cells. Contemporaneously, the reagents are also coupled to a plurality of constricted secondary buffer feeds which permit the reagents to flow into a buffer plenum. The buffer plenum is coupled to the reaction cells. A reagent fluid is selected by activating an electrically operated transducer or microgate to stop or inhibit the flow of the reagent into the drain, thereby forcing the reagent to flow into the secondary buffer feed and into the reaction cell. The volume of the selected reagent within the buffer plenum and the negative pressure tend to isolate other reagents from entering the reaction cell.

BRIEF DESCRIPTION OF THE DRAWINGS

The teachings of the present invention can be readily understood by considering the following detailed description in conjunction with the accompanying drawings, in which:

FIG. 8A illustrates the sectional side view of the present invention with a continuous flow configuration where the microgate is in the "closed" position; and FIG. 8B illustrates the sectional side view of the present invention with a continuous flow configuration where the microgate is in the "open" position.

To facilitate understanding, identical reference numerals have been used, where possible, to designate identical elements that are common to the figures.

DETAILED DESCRIPTION

Figure 1:
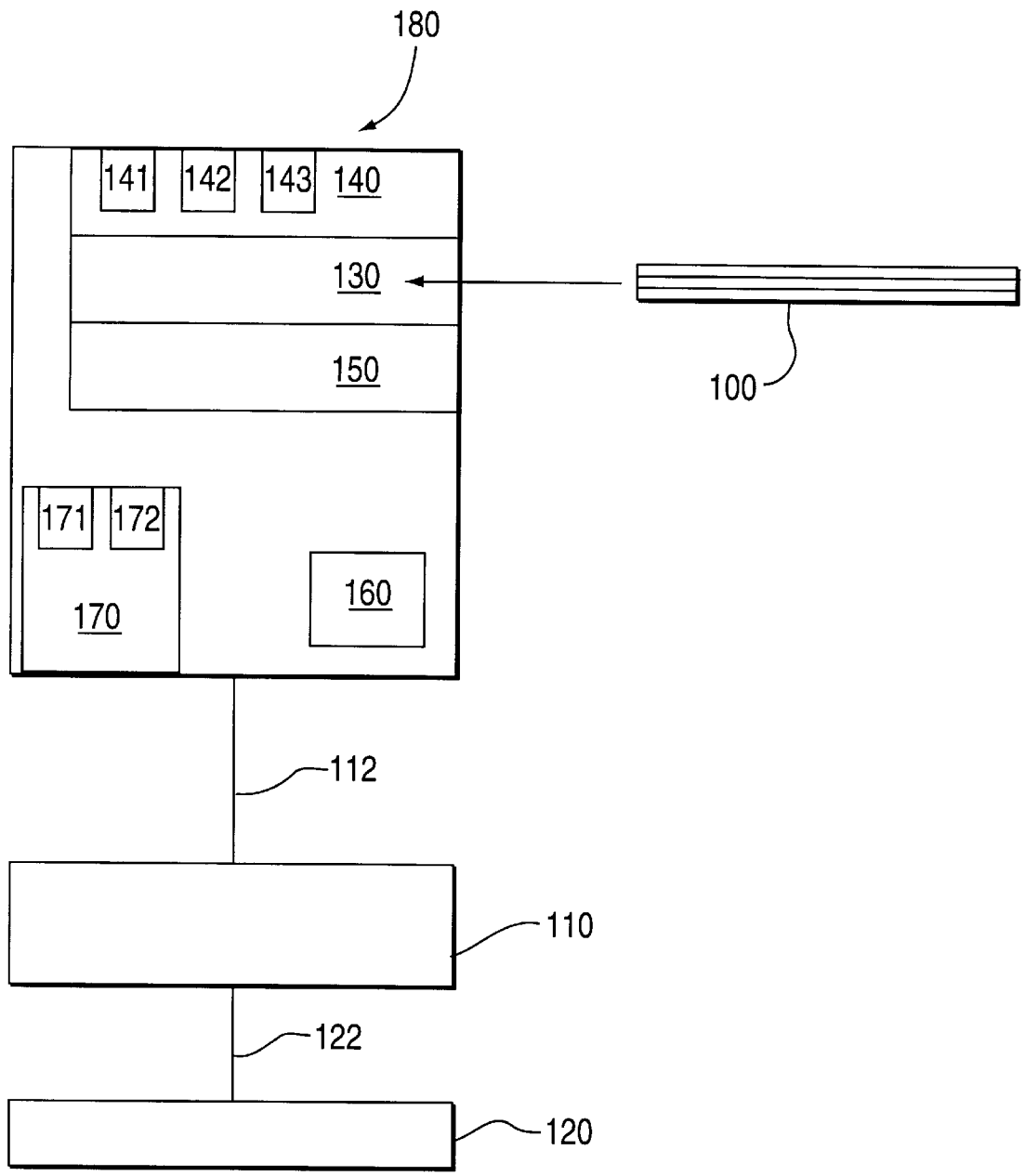
FIG. 1 illustrates the system of the present invention adapted for performing the processes of combinatorial chemistry.

FIG. 1 depicts the system of the present invention adapted for performing the processes of combinatorial chemistry. The system 50 comprises a microelectronic and fluidic array 100, computer 110, peripheral devices 120 and laboratory station 180. The computer 110 is electrically coupled to the laboratory station via line 112, where computer 110 controls the distribution of reagents to the appropriate reaction cells (not shown in FIG. 1) within the device array 100. Computer 110 is also programmed to record and analyze the test results obtained from the device array 100.

Peripheral devices 120 such as a modem or printer are electrically coupled to the computer 110 via line 122. These peripheral devices provide communication and reporting capabilities to the system.

Laboratory station 180 comprises a device array support 130, detector module 140, interface module 150, loading module 170 and waste fluids collectors 160. The laboratory station 180 in combination with computer 110 operates upon device array 100 to perform parallel testing of compounds.

Device array support 130 serves to receive and support device array 100 while reagents are deposited into the reservoirs of the device array. Suitable device array supports or substrate holders are commercially available.

Detector module 140 serves to detect the occurrence of a suitable reaction within the reaction cells of the device array 100. Detector module 140 comprises one or more light sources 141, an optical fiber 142 and one or more light detectors 143 such as a florescence detector. The optical fiber 142 is operative to transmit light from the light source 141 to the detector 143 through the reaction cells. Specifically, the detector module 140 measures the transmittance or absorbency of material in the reaction cells of the device array 100. The detector module 140 verifies the presence or absence of materials in the reaction cells and quantifies their amounts by transmitting the measurement data to the computer 110. Suitable lasers, photodetectors and fiber optic adapters for supporting the optical fiber are all commercially available. Furthermore, various fiber optic adapters may include a lens for efficient transfer of light from the light source into the optical fiber.

Interface module 150 serves as an interface for engaging the plurality of electrical contacts (shown in FIG. 3 and described below) located on the top surface of the device array 100. These electrical contacts provide the necessary electrical connections for operating a plurality of micropumps (not shown), which are employed to regulate the flow of reagents within the device array 100. The interface module 150 which is electrically connected between the computer 110 and device array 100, contains the necessary circuitry and connectors for selectively providing voltages to the electrical contacts of the micropumps in accordance with control signals from the computer 110. For a particular process, the computer 110 activates the micropumps in accordance with a predefined sequence of steps where different reagents are sequentially applied to the reaction cells. Thus, once the reagent reservoirs are filled, the process of loading the multitude of reaction cells with the proper reagent fluids is completely automated. This automation permits the preparation of a large array of reaction cells contemporaneously and reduces the cost and time required to obtain meaningful results.

Loading module 170 comprises pumps 171 and capillary tubings 172 for loading test materials and reagents onto the device array 100. The capillary tubings 172 have an inner diameter of about 200 microns and outer diameter of about 600–700 microns. For certain processes, the capillary tubings 172 are pretreated to eliminate surface adsorption of proteins and related bio-materials in a known manner such as methods disclosed by Cobb, "Electrophoretic Separations of Proteins in Capillaries with Hydrolytically Stable Surface Structures", Anal. Chem. 62, pp 2478–2483 (1990). The loading module 170 loads all materials onto the device array 100. The capillary tubings 172 are positioned over the apertures located on the top surface of the device array 100. Each aperture corresponds to a reagent reservoir located on the center distribution plate within the device array 100. Test materials are deposited into the reagent reservoirs through the force of gravity.

Optionally, pump 171 can be employed to pump the test materials into the reagent reservoirs. The external pump 171 can accurately deliver fluids in reproducible and controlled amounts. The 205U multi-channel cassette pump available from Watson-Marlow, Inc. is a suitable pump.

Waste fluids collectors 160 are housed in the laboratory station for the collection of waste fluids. Depending on a particular process, a plurality of reagent fluids is introduced into the reaction cells sequentially. This process may cause a sequential flushing of the reaction cells with different reagents where the expelled reagent fluids are collected into the waste fluids collectors 160. Furthermore, under a continuous flow configuration, reagent fluids flow continuously within the microchannels of the device array 100. The flow of the reagents in the microchannels is directed toward a drain away from the reaction cells. The excess reagents from the drain are collected into the waste fluid collectors 160.

Figures 2, 2A:
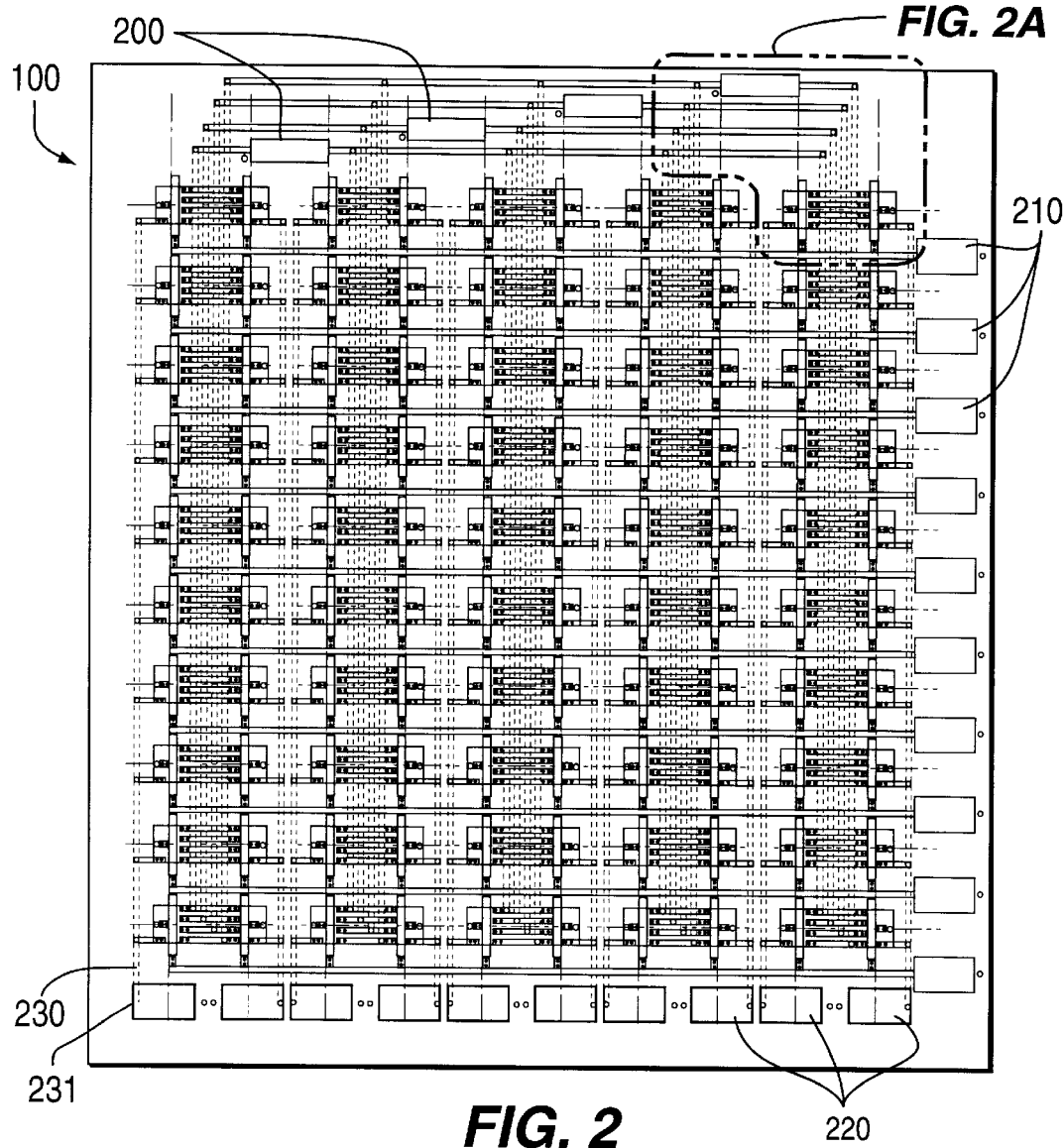
FIG. 2 illustrates the microlaboratory device array of the present invention.
Figure 3:
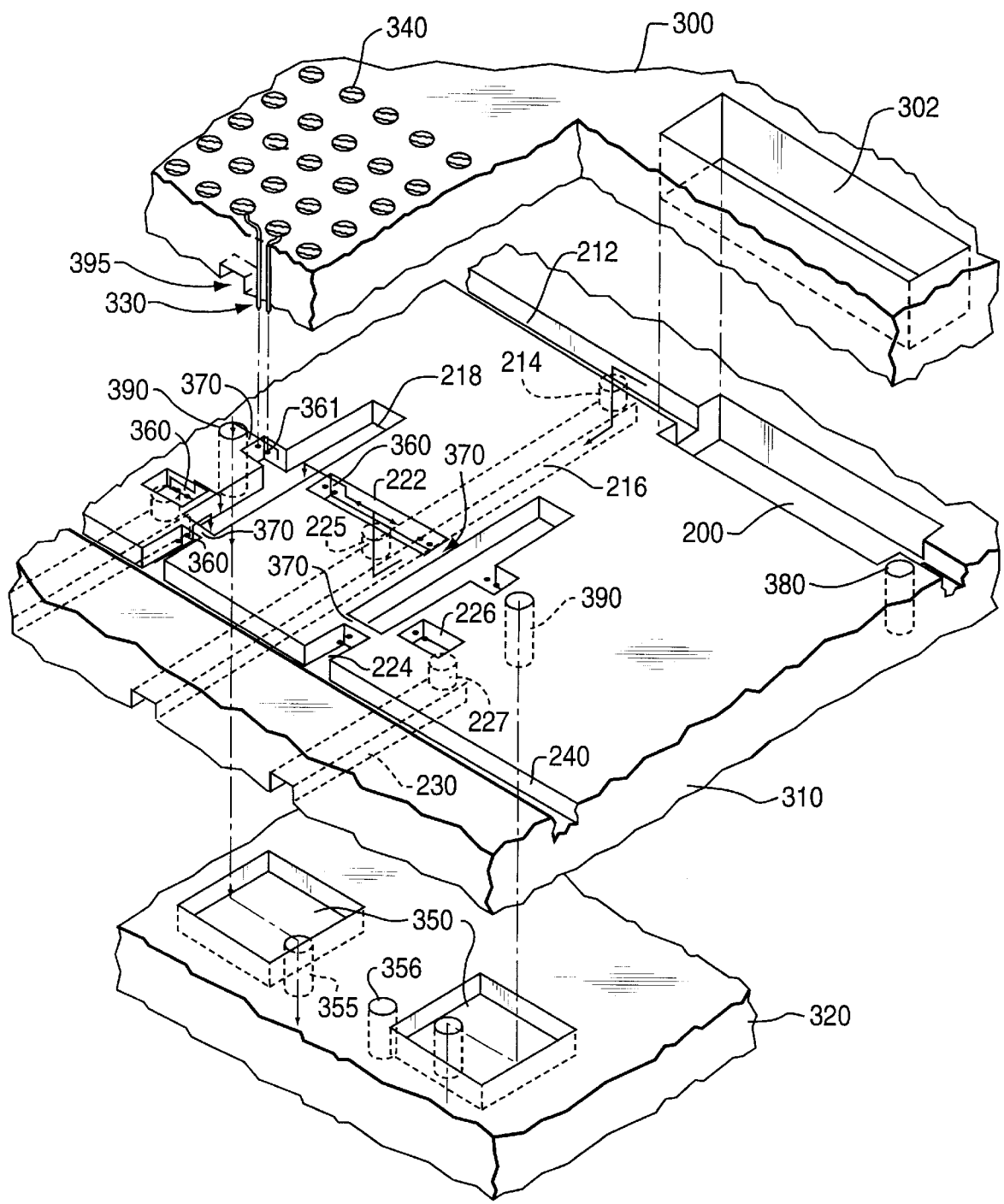
FIG. 3 illustrates an exploded perspective view of a section of the microlaboratory device array of the present invention.
Figure 4:
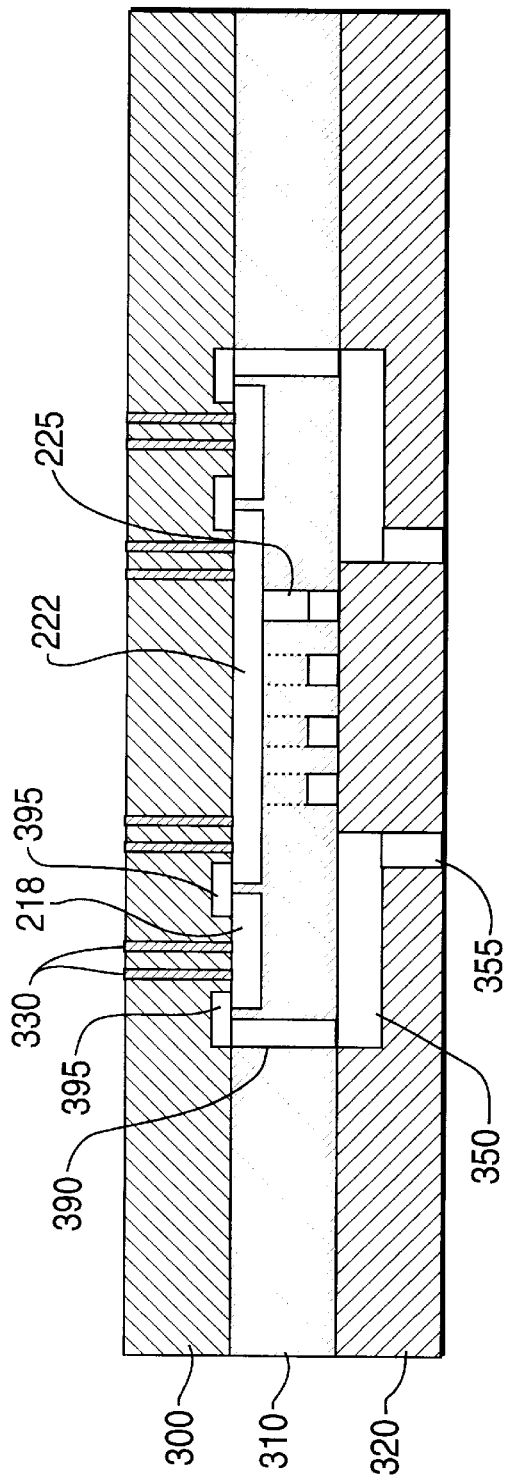
FIG. 4 illustrates a sectional view of the microlaboratory device array of the present invention taken along line 44 of FIG. 2.
Figure 5:
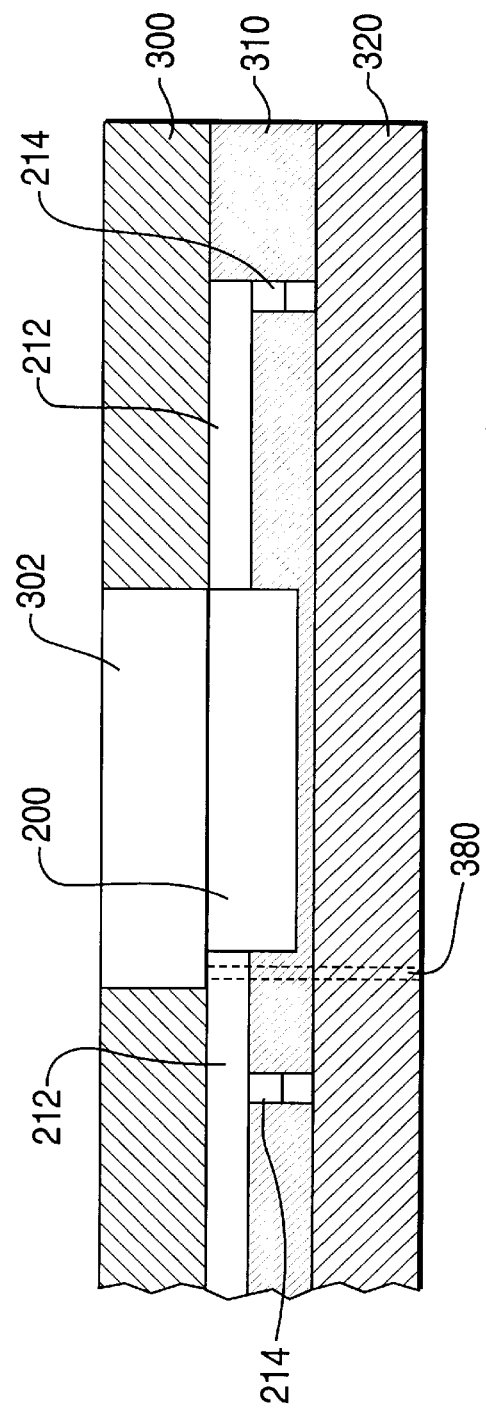
FIG. 5 illustrates a sectional view of the microlaboratory device array of the present invention taken along line 55 of FIG. 2.

FIG. 2 and FIG. 3 depict respectively a top view and an exploded cut-out view of the device array 100 of the present invention, which is a microelectronic and fluidic array having micron sized reservoirs, connecting microchannels, feeds and reaction cells etched into a substrate. The device array 100 comprises three distinct layers or plates. Specifically, the device array 100 comprises a top feedthru plate 300, a center distribution plate 310 and a bottom cell plate 320. The three plates are stacked vertically and coupled together to form a liquid-tight seal. In the preferred embodiment of the present invention, the top feedthru plate 300 is bonded or fused to the center distribution plate 310 by thermal bonding or anodic bonding, while the center distribution plate 310 is detachably coupled to the bottom cell plate 320.

The plates can be made from glass, fused silica, quartz or a silicon wafer. The plates are suitably about 2 inches by 2 inches with a thickness of 1 millimeter. The reservoirs, microchannels and reactions cells are finely and controllably etched onto the plates using traditional semiconductor techniques with a suitable chemical or laser etchant. High quality glasses such as a high melting borosilicate glass or a fused silica are preferred for their ultraviolet transmission properties for processes that use light based technologies. In the preferred embodiment of the present invention, the top feedthru plate 300 is made from glass. The use of glass which serves as an insulator, permits the insertion of micropump electrodes in close proximity through the top feedthru plate 300. The use of other non-insulating material may cause a short between the densely packed micropump electrodes.

The center distribution plate 310 having a complex network of distribution microchannels, reservoirs and various feeds, is made preferably from silicon. The techniques for etching silicon are well known in the art which make silicon a preferred substrate for etching a complex distribution network. However, once etched, the silicon substrate is also pretreated to eliminate surface adsorption of proteins and related bio-materials.

The top feedthru plate 300 serves as a cover for the device array 100 and contains a plurality of apertures 302 selectively positioned above the reagent reservoirs 200, 210 and 220 located in the center distribution plate 310. The apertures are suitably about 500 microns by 3,000 microns and they extend completely through the top feedthru plate 300. These apertures 302 provide the necessary openings for the loading module 170 to fill the reagent reservoirs 200, 210 and 220 with a plurality of reagents or other materials.

The top feedthru plate 300 further comprises a plurality of micropump electrodes 330 that extend completely through the top feedthru plate 300. In the preferred embodiment of the present invention, the micropump electrodes 330 consist of electrical conduit (feedthru) of electroplated gold that terminates as a projection made of platinum. The length of the micropump electrodes 330 is about 50 microns with a diameter of about 50–100 microns. The micropump electrodes 330 are coupled between a plurality of electrical contacts 340 located on the top surface of the top feedthru plate 300 and a plurality of projections 331. Electrodes 330 serve as electrodes for miniaturized electrofluidic pumps 360 (location is shown only as two dots on the center distribution plate 310). The movement of the fluids is accomplished by ionizing the fluids through application of a difference of potential. The electrical contacts 340 are engaged with the interface module 150, thereby permitting the computer 110 to control the activation of the miniature pumps 360 for loading the reaction cells 350 with a predefined sequence of reagent fluids. These miniature pumps 360 are activated by selectively applying a voltage to the electrical contacts 340 located on the top feedthru plate 300.

The miniaturized electrofluidic pumps 360 are based on electrokinetic pumps disclosed by Dasgupta et al., see "Electroosmosis: A Reliable Fluid Propulsion System for Flow Injection Analysis", Anal. Chem. 66, pp 1792–1798 (1994). Other suitable pumps are based on microelectromechanical systems (MEMS) such as reported by Shoji et al., "Fabrication of a Micropump for Integrated Chemical Analyzing Systems", Electronics and Communications in Japan, Part 2, 70, pp 52–59 (1989).

The center distribution plate 310 comprises a plurality of micron sized reservoirs 200, 210 and 220, microchannels 212, 216, 218, 222, 224, 226, 230 and 240, reservoir feeds 214, cell feeds 370 and overflow feeds 380, which are selectively etched on both sides (top and bottom) of the center distribution plate 310. The reagent reservoirs are located on the sides of the device array 100. The reservoirs are classified into matrix reservoirs 200, row reservoirs 210 and column reservoirs 220. Column reservoirs 220 are coupled to microchannels that deliver reagents to a location vertical from the column reservoirs, while row reservoirs 210 are coupled to microchannels that deliver reagents to a location horizontal from the row reservoirs. Finally, matrix reservoirs 200 are coupled to microchannels that deliver reagents to a location both vertical and horizontal from the matrix reservoirs. Although three (3) sets of reagent reservoirs 200, 210 and 220 are illustrated, those skilled in the art will realize that additional sets of reagent reservoirs can be incorporated into the device array.

The matrix reservoirs 200 are capable of providing reagent fluids to all reaction cells 350. Referring to FIG. 2 and FIG. 3, each matrix reservoir 200 is connected to a horizontal microchannel 212 which extends horizontally across the device array 100 (from a top perspective view). A plurality of reservoir feeds 214 is placed along the length of microchannel 212. Each reservoir feed 214 serves as a feedthru for connecting a horizontal microchannel 212 with a vertical microchannel 216 which extends vertically across the device array 100 (from a top perspective view). The vertical microchannel 216 is in turn coupled to a distribution microchannel 222 via distribution feed 225. Thus, the matrix reservoirs 200 are capable of providing reagents to all "sectors" on the center distribution plate 310. Each sector on the center distribution plate 310 is an area positioned directly above a reaction cell as illustrated by FIG. 3.

To illustrate, as a reagent fluid is deposited into matrix reservoir 200, the reagent fluid fills the reservoir 200 and overflows into horizontal microchannel 212. The reagent fluid is channeled downward into the vertical microchannel 216 via reservoir feed 214, which functions like a feedthru. Finally, as the reagent fluid completely fills the length of vertical microchannel 216, the reagent fluid swells upward into distribution microchannel 222 via distribution feed 225. The reagent fluid will only rise up to the top surface of the center distribution plate 310. The underlying reason is that the reagent fluid level is controlled by the overflow feeds 380 and by the physical contact of the top feedthru plate 300. As the reagent fluid completely fills all the distribution microchannels 222, the level of the fluid is stabilized by draining excess fluids into overflow feeds 380. It should be noted that for simplicity, FIG. 3 depicts only one set of microchannel 216 and distribution microchannel 222. As illustrated in FIG. 2, there are actually four (4) sets (or more) of these microchannels.

The flow of reagent fluids from the row reservoirs 210 operates in a similar fashion. As a reagent fluid is deposited into row reservoir 210, the reagent fluid fills the reservoir and overflows into horizontal microchannel 240. The reagent fluid simply flows along the horizontal microchannel 240 and into microchannels 224. Finally, as the reagent fluid completely fills the length of microchannel 240, the reagent fluid also rises up to the top surface of the center distribution plate 310. Again, the overflow feeds 380 and the physical contact of the top feedthru plate 300 combine to control the reagent fluid level. As the reagent fluid completely fills all the distribution microchannels 224, the level of the fluid is stabilized by draining excess fluids into overflow feeds 380. One significant difference between the matrix reservoirs 200 and the row reservoirs 210 is that the row reservoirs are only capable of delivering its reagents to the reaction cells 350 that are situated horizontally from the row reservoirs. However, the matrix reservoirs 200 are capable of delivering its reagents to all reaction cells 350 within the device array 100.

The flow of reagent fluids from the column reservoirs 220 also operates in the same manner. As a reagent fluid is deposited into column reservoir 220, the reagent fluid fills the reservoir and overflows downwardly into vertical microchannel 230 via column feed 231, which functions like a drain. Finally, as the reagent fluid completely fills the length of the vertical microchannel 230, the reagent fluid swells upward into distribution microchannel 226 via distribution feed 227. Again, the same overflow scheme controls the reagent fluid level from the column reservoir 220. Similar to the row reservoirs, the column reservoirs are only capable of delivering its reagents to the reaction cells 350 that are situated vertically from the column reservoirs. This configuration of the various reservoirs permits a large array of parallel tests to be conducted simultaneously.

To illustrate, using a device array with x by y number of reaction cells, the matrix reservoirs, row reservoirs and column reservoirs may incorporate a flushing agent, reagent fluid A of different concentrations ($A_1$-$A_x$) and reagent fluid B of different concentrations ($B_1$-$B_y$) respectively. Each concentration of the reagents A and B is stored in a separate reservoir. The process starts by releasing the reagent fluids $A_1$-$A_x$ from the row reservoirs into the reaction cells and then applying the flushing agent through the whole distribution system for cleansing purposes. Next, the process may release the reagent fluids $B_1$-$B_y$ from the column reservoirs into the reaction cells. Under this illustrative example, all the possible permutations of combining different concentrations of reagent fluid A with different concentrations of reagent B are accomplished efficiently and contemporaneously in parallel in one single device array. Due to the small size of the device array 100, the amount of reagents consumed is on the order of nanoliters instead of liters.

Referring to FIGS. 2–5, the reagent fluid is prohibited from flowing into buffer channel 218 by a plurality of dams 370. The dams safeguard against seepage of unwanted reagents into the reaction cells 350 and also safeguard against cross contamination of different reagent fluids. A micropump 360 is positioned at the edge of each dam 370 where, upon activation, the micropump permits the reagent fluids to enter into buffer channel 218 through a flow sluice 395. A flow sluice which is etched on the bottom surface of the top feedthru plate 300 is provided for each dam 370. Once the reagent fluid enters the buffer channel 218, another micropump 361 is activated to pump the reagent fluid into the reaction cell 350 via a cell feed 390. The buffer channel 218 effectively provides an additional safeguard against contamination of the reaction cell 350 with unwanted reagents. The buffer channel serves to dilute any seepage of unwanted reagents that may enter the buffer channel 218. During normal operation, the buffer channel 218 is filled with the desired reagent which is pumped into the buffer channel from one of the distribution microchannels 222, 224 or 226. Thus, there is a flow of reagent fluid from the desired distiibution microchannel to the reaction cell 350 via the buffer channel 218. This positive flow effectively prevents the seepage of unwanted reagents from the remaining two distribution microchannels, which actually experience a slight negative pressure. In the event that unwanted reagents do enter the buffer channel 218, the impact of the contamination is reduced because the contamination is diluted with the desired reagents presently in the buffer channel 218.

To summarize, the center distribution plate 310 is defined into a plurality of sectors in a glid configuration. Each sector on the distribution plate is positioned directly above a reaction cell 350 located on the bottom cell plate 320. The reagents channeled to a sector from the different reservoirs 200, 210, and 220 are prohibited from entering the cell feed 390 by a plurality of dams 370. By activating the miniature pumps 360 and 361, selected reagents are drawn over the dams 370 from the distribution microchannels through the buffer channel and are deposited into the reaction cells 350 located on the bottom cell plate 320 via the cell feeds 390.

In the preferred embodiment of the present invention, the diameter of the various feeds are suitably about 100 microns. The depth of each feed depends upon the microchannels that are connected by such feed. The size of the microchannels is suitably about 150 microns in width and about 100 microns in depth. Depending on the application, the length of the microchannels varies from 500 microns to the full length of the device array 100.

The bottom cell plate 320 comprises a plurality of micron sized reaction cells 350 and drain feeds 355. In the preferred embodiment of the present invention, the bottom cell plate 320 comprises a total of one hundred (10 by 10) reaction cells 350. However, those skilled in the art will realize that the device array can incorporate any number of reaction cells by adjusting the size of the device array. The size of the reaction cell is suitably about 1,000 microns by 1,000 microns with a depth of about 250 microns. The bottom cell plate 320 effectively serves as a detachable microlaboratory tray of reaction cells 350 replacing the tray of vials used in the traditional process of combinatorial chemistry. Once the proper reagents or other materials are introduced into the reaction cells 350, the bottom cell plate 320 is decoupled from the device array 100 and removed for incubation or analysis. Generally, the bottom cell plate 320 is analyzed under a detector, such as a fluorescence detector, to screen for a desired reaction.

The drain feed 355 provides a drain for removing materials from the reaction cell 350 to the waste fluid collectors 160 of laboratory station 180. The drain feeds 355 is disposed on the bottom of the reaction cells 350. Alternatively, as shown in FIG. 3, the drain feeds 356 can be disposed along side of the reaction cell 350 as in the case of the overflow feeds 380 in relation to the reservoirs 200. Again, a flow sluice (not shown) which is etched on the bottom surface of the center feedthru plate 310 is provided over each dam separating the reaction cell and the drain feed, for allowing the reagent fluids to enter the drain feed 356. In this alternate configuration, solid materials such as catalyst beads (not shown) which are used to provide reaction surfaces, will not hinder the flow of waste fluids exiting the reaction cells 350.

Figure 6:
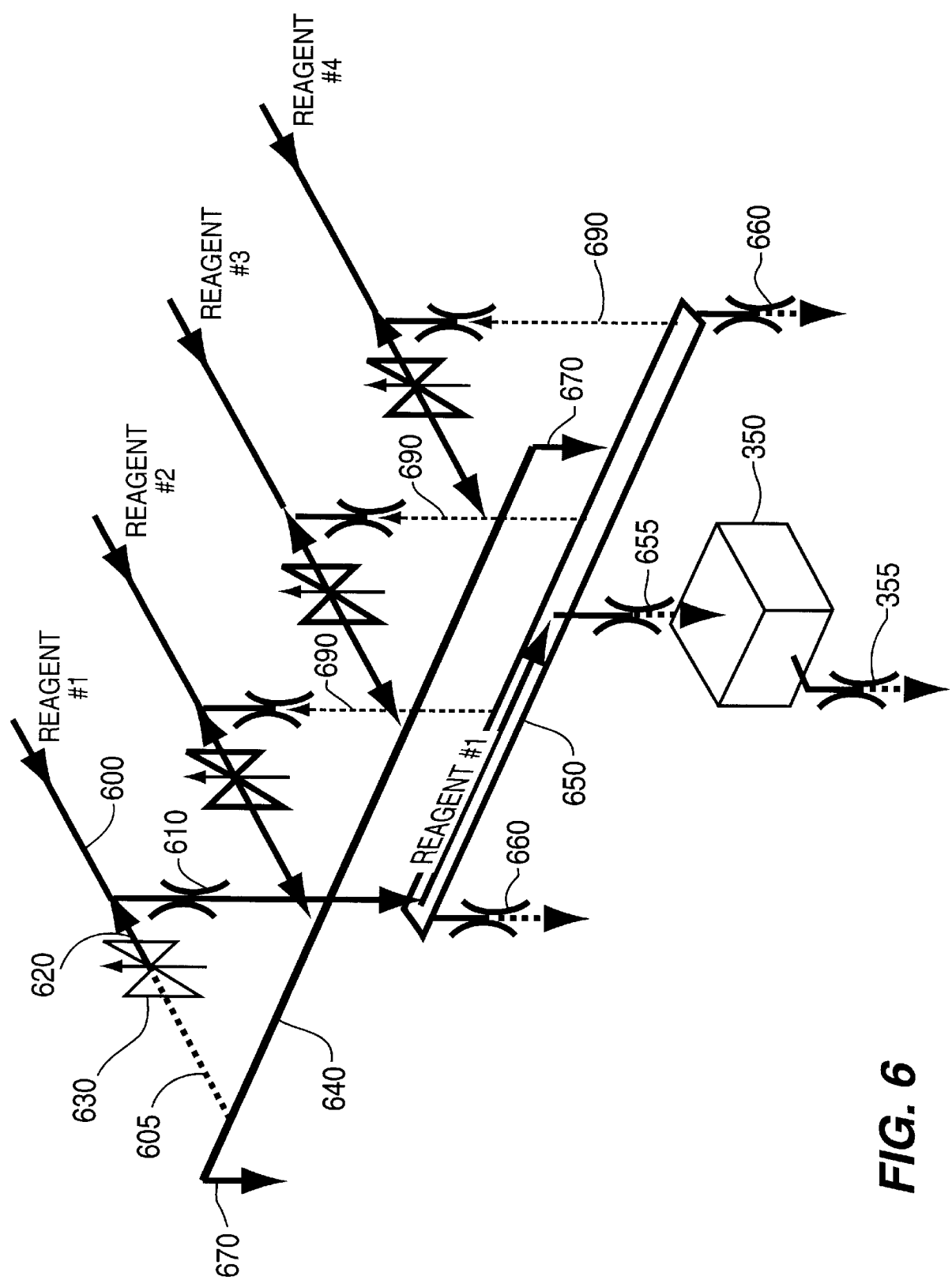
FIG. 6 illustrates another embodiment of the present invention with a continuous flow configuration.
Figure 7:
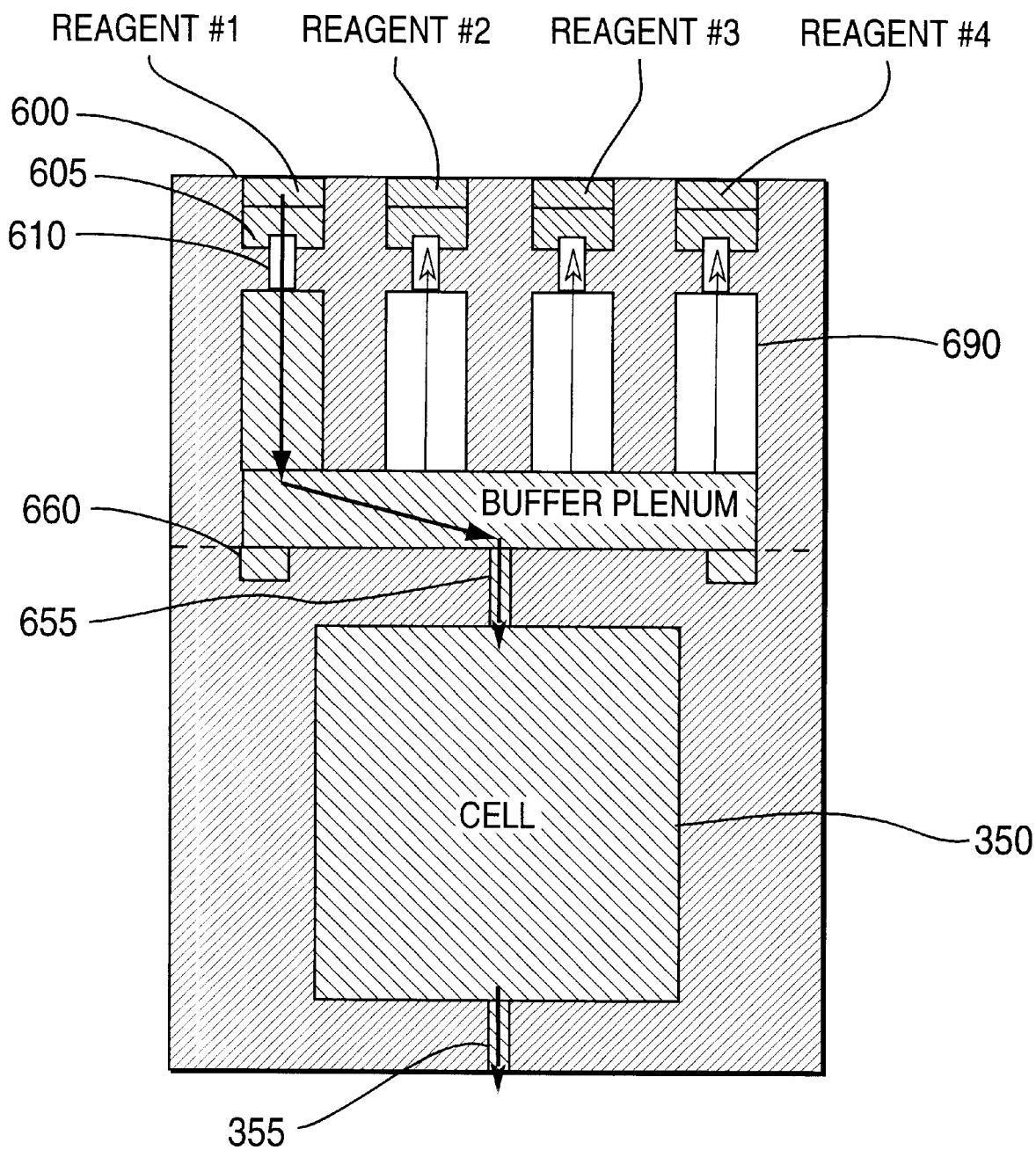
FIG. 7 illustrates the sectional front view of the present invention with a continuous flow configuration.

FIG. 6 and FIG. 7 depict a second embodiment of the present invention, where the center distribution plate 310 incorporates a continuous flow configuration as opposed to an interrupted flow configuration as disclosed above. The continuous flow configuration incorporates a steady flow of reagents within the microchannels 600. The steady flow of the reagents in the microchannels 600 is directed toward a branch bypass microchannel 605 that leads to a common bypass channel 640 where the reagents are channeled into a drain 670 and away from the reaction cell 350. To enhance the flow of reagents toward the drains 670, each microchannel 600 incorporates an expansion section 620 where the microchannel 600 is widen to permit easy passage of reagent fluids. Contemporaneously, the reagents are also coupled to a constricted secondary buffer feed 610 which permits the reagents to flow into a buffer plenum 650. The buffer plenum 650 is coupled to the reaction cell 350 via a cell feed 655.

Furthermore, a transducer or microgate 630 (can also be a micropump 360 operated in reverse) is disposed along the expansion section 620. The microgate 630 is controlled in the same manner as the micropumps 360 as disclosed above. However, unlike the micropumps 360, the microgate 630 functions as a gate to selectively prohibit the flow of reagent fluids when the microgate is activated.

FIGS. 8A and 8B illustrate the operation and effect of the microgate 630. In FIG. 8A, the microgate 630 is in the "closed" position where the branch bypass microchannel 605 is blocked by the microgate 630. The reagent fluid is redirected into the constricted secondary buffer feed 610 and into the buffer plenum 650. The steady flow of reagent fluid is received by the reaction cell 350 and the buffer overflow drains 660. Thus, a reagent fluid is selected by activating the corresponding microgate 630 to stop or inhibit the flow of the reagent fluid into the common bypass 640, thereby forcing the reagent fluid to flow into the secondary buffer feed 610 and into the reaction cell 350. Again, the diluting effect of the selected reagent fluid within the buffer plenum 650 and the negative pressure (illustrated as 690 in FIG. 6 and 7) tend to isolate other reagents from entering the reaction cell 350. In fact, the negative pressure may cause the selected reagent fluid to flow into the microchannels 600 of other reagent fluids. However, this contamination is negligible because the steady flow of reagent fluids within the microchannels 600 will likely carry the contamination to the common bypass 640 due to the positive fluid flow.

Conversely, FIG. 8B depicts the microgate 630 in the "open" position where the branch bypass microchannel 605 is unrestricted by the microgate 630. The reagent fluids tend to flow in the direction of least resistance which is in the direction of the expansion section 620. The reagent fluids enter the common bypass 640 and are directed toward drains 670 away from the reaction cell 350. In fact, a slight negative pressure or zero pressure may exist at the secondary buffer feed 610 to prevent the contamination of the reaction cell by unwanted reagent fluids.

There has thus been shown and described a novel system and method that incorporates a layered array for inhibiting cross-contamination of reagent fluids used in the processes of combinatorial chemistry. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A device for separately and selectively distributing liquids from each of one or more liquid sources to a plurality of sectors located on a common surface of a distribution substrate, the device comprising:

the distribution substrate;

at least a first liquid source;

a network of microchannels connecting the at least one liquid source to a plurality of the sectors, wherein the microchannels form outlets at the sectors; and a plurality of micropumps each comprising at least two electrodes, wherein the micropumps move liquids by means of the electrodes, the micropumps located in the substrate to provide selective pumping of liquid out of the outlets.

2. The device of claim 1, wherein the substrate comprises two or more plates each having at least one junction to another such plate at which junction a surface of the plate is bonded to a surface of another such plate, and wherein portions of the microchannels are formed as trenches in plate surfaces found at such junctions.

3. The device of claim 2, wherein a plate has a plurality of apertures for transferring fluids into the liquid sources.

4. The device of claim 2, wherein a plate has a plurality of electrical conduits extending through the plate and connected to the micropumps.

5. The device of claim 1, wherein the device can be selectively operated to distribute either liquid from the first liquid source or liquid from a second liquid source to each of a plurality of the sectors.

6. The device for separately and selectively distributing liquids from each of one or more liquid sources to a plurality of sectors of claim 1 comprising, in the substrate:

for a plurality of outlets, a barrier to flow interposed between the liquid source and the outlet for inhibiting flow out of the outlet in the absence of pumping by a corresponding micropump.

7. A device for separately and selectively distributing liquids from each of one or more liquid sources to a plurality of sectors arrayed on a surface of a substrate, the device comprising the substrate comprising two or more plates each having at least one junction to another such plate at which junction a surface of the plate is bonded to a surface of the other such plate, and further comprising within the substrate:

at least a first liquid source;

for each liquid source, a microchannel connected to the liquid source, wherein portions of the microchannel has at least one outlet to one of the sectors, wherein portions of the microchannels are formed as trenches in plate surfaces found at said junctions;

for each outlet, a barrier to flow is interposed between the liquid source and the outlet for inhibiting flow out of the outlet;

a plurality of micropumps embedded within the substrate; and a plurality of electrical conduits for directing electrical power to the micropumps, wherein the micropumps each comprise at least two electrodes contacting a microchannel from the electrical conduits, each micropump for selectively pumping liquid past at least one of the barriers, wherein liquid flows past each of the barriers when the corresponding micropumps are activated.

8. The device of claim 7, wherein microchannels are created (a) from said trenches and (b) from holes formed through such plates.

9. The device of claim 8, wherein a first system of microchannels that delivers liquid from the first liquid source to a set of two or more sectors avoids intersecting with a second system of microchannels that delivers liquid from a second liquid source to said set of sectors by means of using said plate-traversing holes to connect microchannel segments formed at one plate interface to microchannel segments formed at another plate interface as appropriate to allow the microchannels of the first and second systems to avoid intersecting.

10. The liquid distribution system for directing two or more liquids to each of two or more sectors, the liquid distribution system comprising a substrate that comprises a series of plates bonded top to bottom, each plate formed of material susceptible to microfabrication methods for forming microchannels on the surface of the plate, the plates comprising:

the first liquid source and at least one additional liquid source;

at least one first feeder microchannel segment connected to each of the liquid sources, each first feeder microchannel segment formed along a first junction between two of the plates; and at least one distribution microchannel and having an outlet at one or more of said sectors, connected to each feeder microchannel segment and formed along a second junction, distinct from the first, of two plates;

wherein filling each first source with a liquid results in filling the connected first feeder microchannel segments and connected distribution microchannels, and wherein distribution microchannels connected to one first feeder microchannel segment avoid intersecting with other first feeder microchannel segments due to being formed along the second junction instead of along the first junction where the first feeder microchannel segments are formed.

11. The liquid distribution system of claim 10, wherein in the series of bonded plates at least two first feeder microchannel segments, comprising a first feeder microchannel segment from each of the at least two first liquid source, are parallel and adjacent to one another, and these parallel and adjacent microchannel segments define a route for delivering liquid from the each of two or more first liquid sources to two or more sectors.

12. The liquid distribution system of claim 11, wherein each of the parallel and adjacent first feeder microchannel segments is connected to a separate distribution microchannel and each of said connected distribution microchannels are parallel and adjacent to one another.

13. The liquid distribution system of claim 10, wherein the micropumps move liquids by means of electrodes.

* * * * *